United States Patent [19]
Lagin

[11] 3,783,755
[45] Jan. 8, 1974

[54] APPARATUS FOR APPLYING INDICIAS TO SHEETS

[76] Inventor: Herbert Lagin, 31 Deer Park Rd., Great Neck, N.Y. 11024

[22] Filed: June 5, 1972

[21] Appl. No.: 260,002

Related U.S. Application Data

[63] Continuation of Ser. No. 885,456, Dec. 16, 1969, abandoned.

[52] U.S. Cl. .................................... 95/1.1, 355/40
[51] Int. Cl. ............................................ G03b 17/24
[58] Field of Search .......................... 95/1.1; 355/40

[56] References Cited
UNITED STATES PATENTS
2,206,206   7/1940   Smith ..................................... 355/40
2,975,285   3/1961   Schaeffer .............................. 355/40

Primary Examiner—John M. Horan
Attorney—J. B. Felshin

[57] ABSTRACT

This combination payroll check, data and identification sheet is prepared on a computer. One prepunched computer card controls typing on the check and on the data section of the sheet. Attached thereto is an identification section controlled by an identification card prepunched for proper stacking and carrying a photo of the employee, and a replica of his signature. This identification is photocopied on the identification section. When the check is being cashed, the photo can be looked at to identify the employee and the employee countersigns on the identification section, thus making doubly sure that the check is not cashed by an unauthorized person.

4 Claims, 4 Drawing Figures

PATENTED JAN 8 1974

INVENTOR.
HERBERT LAGIN
BY
J.B. Felshin
ATTORNEY

APPARATUS FOR APPLYING INDICIAS TO SHEETS

This is a continuing application of original application Ser. No. 885,456, now abandoned filed Dec. 16, 1969 of applicant.

This invention relates to computerized employee payroll checks combined with means for positively identifying the employee when cashing the check.

It is well known that employees' payroll checks are often stolen and cashed by unauthorized persons. These payroll checks are often passed through computers controlled by prepunched record cards for typing the checks. Such checks carry an extension on which payroll data, such as an employee's statement of earnings and deductions, is typed. The prepunched record card controls the typing on the check and on the extension.

An object of this invention is to provide a second extension on the check, on which there is photocopied, means to identify the employee receiving the check, when the check is cashed, to thereby prevent an unauthorized person from cashing the check.

Another object of this invention is to provide an identification computer card having punched holes corresponding to the employee's computer number, to put the card in proper stacking order with the employee's prepunched record card, and carrying an identification means for the employee, which identification is photocopied onto said second extension of the employee's check, whereby the check and the first extension are typed under control of the record card, and the second extension receives a photocopy under control of the identification means on the identification card.

Yet a further object of this invention is to provide an identification means which comprises a photo of the employee, and a replica of his signature, so that when the check is being cashed, the person cashing the check can look at the photo for verification, and also to request the check holder to countersign his name in his presence, so as to compare signatures. This identification means can carry other data, if desired.

In accordance with the invention the first and second extensions may be severed along lines of perforations to separate them from the check.

For a wet photocopy system, the second extension comprises sensitized paper, and in such case, hot air means may be provided to dry the photocopied section.

A further object of this invention is to provide a novel and economical process for producing combination checks of the character described.

A still further object of this invention is to provide a safe combination check of the character described, which will be difficult to cash by unauthorized persons, and which shall be relatively inexpensive to manufacture and practical, safe and efficient to a high degree in use.

Other objects of this invention will in part be obvious and in part hereinafter pointed out.

The invention accordingly consists in the features of construction, combinations of elements, steps in process, and arrangement of parts which will be exemplified in the construction hereinafter described, and of which the scope of invention will be indicated in the following claims.

In the drawing:

FIG. 1 is a top plan view of part of a sheet of blanks for making checks embodying the invention;

FIG. 2 is top plan view of a completed article embodying the invention;

Figure 3:
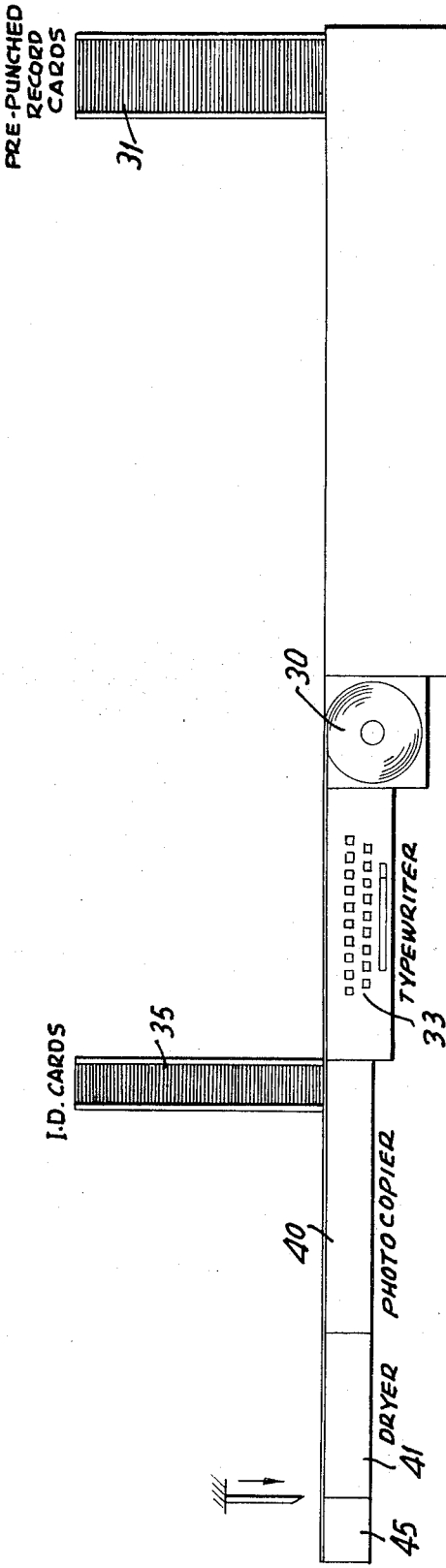
FIG. 3 is a diagramatic view of apparatus for producing combination checks embodying the invention.

Referring now in detail to the drawing, 10 designates a rolled sheet of connected blanks 11 to be later cut one at a time, after being completed in the manner hereinafter explained, along parallel lines 12, transversely of the sheet, to separate the sheet into individual checks with data and identification extensions.

Each blank 11 comprises a rectangular check section 14 from one end of which there extends a first rectangular extension 15. Said extension 15 comprises a data bearing section. A vertical line 18 of perforations is disposed between sections 14 and 15.

Extending from section 15 is a second rectangular extension 20. Between sections 15 and 20 is a vertical line 21 of perforations. All the sections 14, 15, 20 are of same height from top to bottom. Section 20 is plain paper if the photocopying, to be referred to hereinafter is done by a dry process, and is of presensitized paper if the photocopying is to be by the wet process.

The check blank section may be like any usual check. The data extension blank section 15 may be like any usual section carrying employee's statement of earnings and deductions. However, this section also carries a notice that the check is not valid if the identification section 20 is removed prior to cashing. Such notice may be applied to the bottom of section 15, as at 25. This section 15 may carry the name and address of the payee and may carry the words "Employee's statement of earnings and deductions," and the word "Retain." It may also carry titled boxes for insertion of various data relative to earnings and deductions such as "time worked," "net amount," "period ending" and employee's computer number. Said blank may also carry notice that it should be detached by the employee after cashing and kept for his records.

FIG. 3 shows computer apparatus for processing the sheet 10. The sheet 10 may come in a roll 30 placed in a usual computer check processing apparatus which includes a stack of prepunched computer cards 31 of usual construction. The holes in the cards 31 include holes to determine the employee's number and name, the date, the amount of the check, all of which are typed onto section 14 by the usual typewriter equipment 33 forming part of the computer apparatus under control of the record card. The card 31 is also punched to cause the typewriter equipment to type the time worked, regular earnings, overtime earnings, gross pay, F.I.C.A. deduction, Federal withholding tax, State withholding tax, disability deduction, union dues deduction, amount of loan, amount assigned, net amount to be paid to the employee, the date ending the period of employment for which the check is issued, and the employee's number. Any other pertinent data may also be typed on blank section 15 under control of prepunched holes on the card 31.

Figures 1, 2:
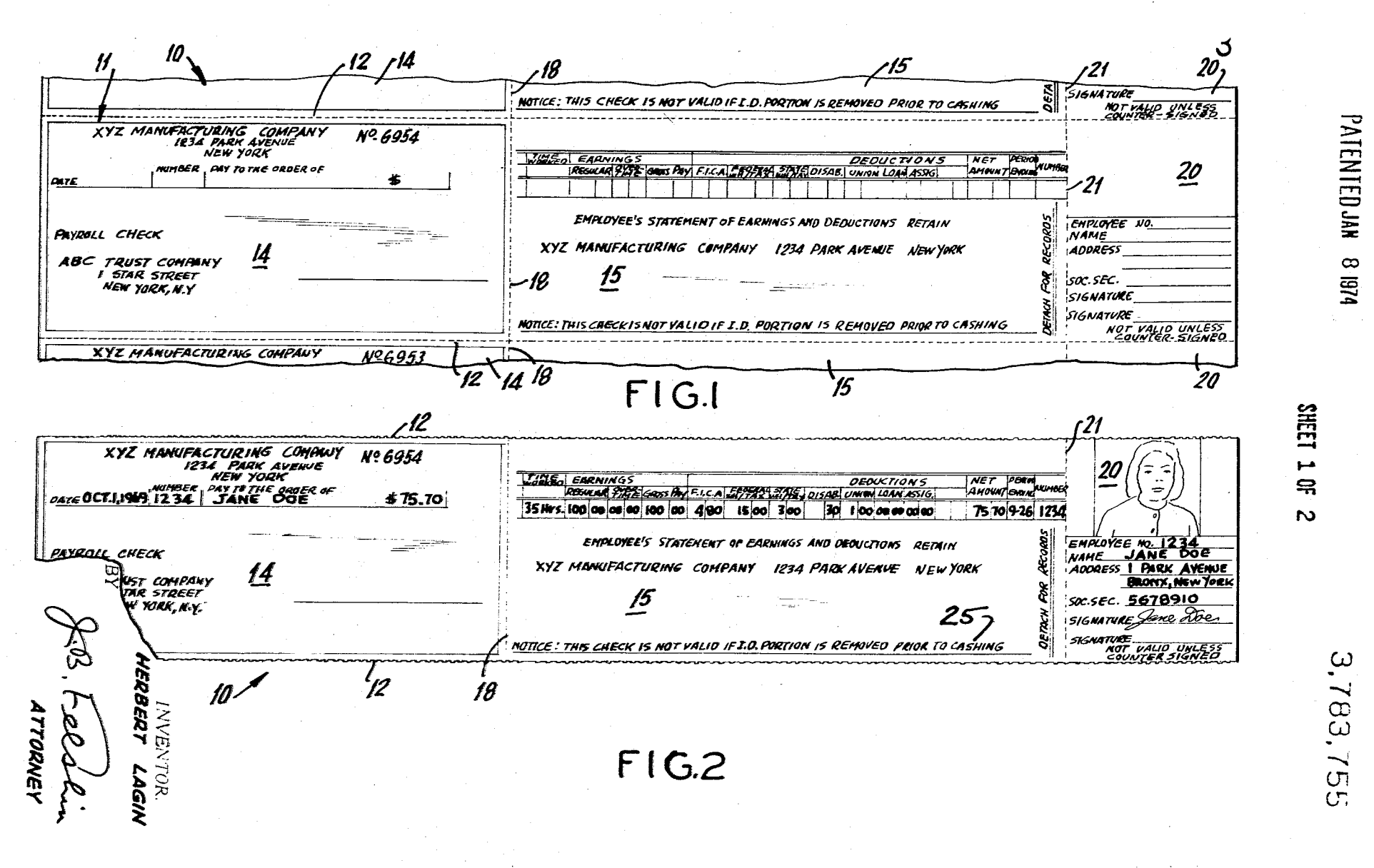

A second stack of identification cards 35 is employed to control photocopying identification on the employee, on section 20. In FIG. 2 there is illustrated one of the blanks 10, but with the sections 14 and 15 typed under control of card 31, and with section 20 having identification applied thereto which is derived from card 35.

Figure 4:
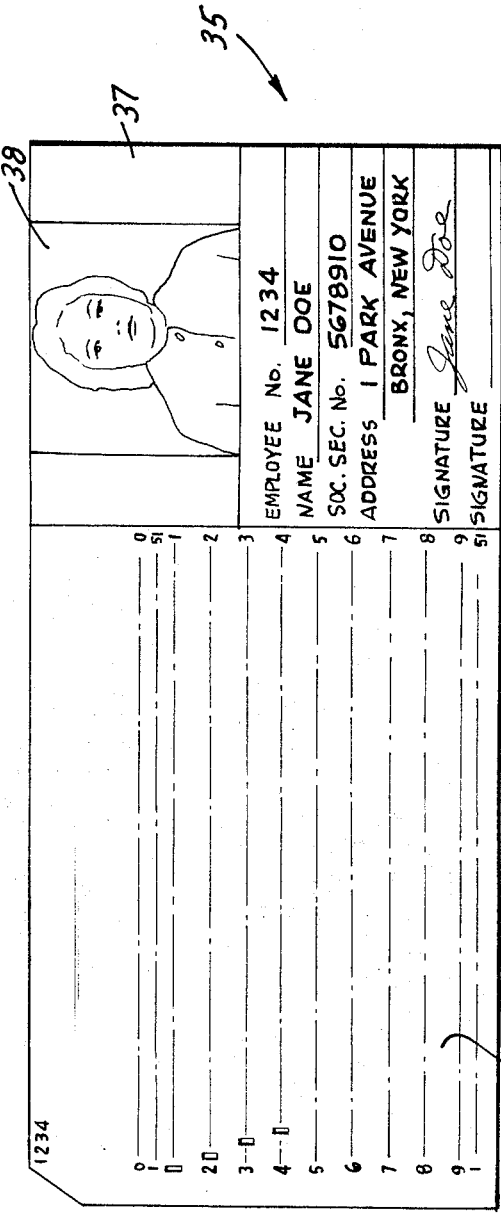
FIG. 4 is a top plan view of an identification card used in the making of the article embodying the invention.

Card 35 has a section 36 which is prepunched only for the employee's number, to put the card in proper stacking order for photocopying the identification appearing on section 37 of card 35 (FIG. 4). Thus, card 31 causes the computer to type on sections 14, 15 of a blank 10, and card 35 causes photocopying on section 20 of the same blank.

Section 37 carries a picture or photograph 38 of employee, the employee's number, name, social security number, and address. It also carries a replica of the employee's signature (FIG. 3) and has a space for the employee to countersign, adjacent said signature replica.

The photocopying may be accomplished by photocopier 40 (FIG. 3). The sheet unrolls from roll 30 and passes to the typewriter part 33 of the apparatus, and then to the photocopier 40. The stack of cards 35 are placed so that the sections 37 of the selected card can be photocopied on sections 20.

If the photocopier is a wet process piece of apparatus, a dryer 41 is employed to blow hot air on section 37 after photocopying to dry the same. If a dry photocopier is employed, no drying equipment need be used. A usual cutter 45 cuts the blanks along lines 12 so that the completed blanks come off one at a time.

Instead of a roll 30, the blanks 11 may be individual blanks, and stacked to replace the roll.

Proper feed means for the sheet 10 (or individual blanks 11) are well known in the art.

Although photocopying of section 37 of card 35 has been mentioned, it will be understood that the matter appearing on said section can be applied to section 20 of blank 11 by photographic, photo-offset, printing or any other transference process.

It will thus be seen that there is provided a process and article in which the several objects of this invention are achieved, and which is well adapted to meet the conditions of practical use.

As possible embodiments might be made of the above invention, and as various changes might be made in the embodiments above set forth, it is to be understood that all matter herein set forth or shown in the accompanying drawings, it is to be interpreted as illustrative only.

What is claimed is:

1. Apparatus for applying to each of a plurality of sheets, successively, different but corresponding first and second indicias, comprising a first set of computer data carrying means arranged in a predetermined order, a plurality of sheets, means for applying first indicias to said sheets, means for feeding said sheets, seriatim, to said applying means, means on said first set of computer data carrying means for causing said first indicias applying means to apply first indicias to said sheets, successively, a second set of data carrying means, means to arrange the data carrying means of the second set in an order corresponding to the predetermined order of said first set of computer data carrying means, means to feed the data carrying means of the second set, successively, in an order of the first set, to said sheets, said second set of data carrying means being provided with second indicias, and means for causing said second indicias on the second set, to be applied to said sheets, successively, so that each sheet has both first indicias and second indicias applied thereto, controlled by corresponding pairs of data carrying means of the first and second sets.

2. Apparatus for applying to each of a plurality of sheets, successively, different but corresponding first and second indicias, comprising a first set of stacked computer cards formed with stacking control prepunch means, a plurality of sheets, means for applying first indicia to said sheets, and other prepunch means on said cards capable of controlling said means for applying first indicias to said sheets, means to feed the cards of said first set of stacked computer cards, seriatim to said applying means, means for feeding said sheets seriatim to said applying means, and thereby causing said applying means under control of said other prepunch means, to apply first indicias to said sheets successively, means to move said sheets with first indicias applied to them, beyond said applying means, a second set of computer cards provided with a prepunch stacking means corresponding to the prepunch stacking means on the first set of cards, means to feed the cards of the second set successively in an order corresponding to the order of feed of the cards of the first set to the applying means, to the sheets which have been moved beyond said applying means, said cards of the second set being provided with transferable second indicias, and means for transferring the second indicias on the cards of the second set to said sheets, successively, so that each sheet has first indicias and second indicias applied thereto, controlled by corresponding pairs of cards of the first and second sets of computer cards.

3. Apparatus for applying to each of a plurality of sheets, successively, different but corresponding first and second indicias, comprising a first set of stacked computer cards formed with stacking control prepunch means, a plurality of sheets, means for applying first indicias to said sheets, and other prepunch means on said cards capable of controlling said means for applying first indicias to said sheets, means to feed the cards of said first set of stacked computer cards, seriatim to said applying means, means for feeding said sheets seriatim to said applying means, and thereby causing said applying means under control of said other prepunch means to apply first indicias to said sheets successively, a second set of computer cards provided with a prepunched stacking means corresponding to the prepunch stacking means on the first set of cards, means to feed the cards of the second set successively in an order corresponding to the order of feed of the cards of the first set to the applying means, to the sheets, said cards of the second set being provided with transferable second indicias, and means for transfering the second indicias on the cards of the second set, to said sheets, successively, so that each sheet has first indicias and second indicias applied thereto, controlled by corresponding pairs of cards of the first and second sets of computer cards.

4. Apparatus for applying to each of a plurality of sheets, successively, different but corresponding first and second indicias, comprising a first set of stacked computer cards formed with stacking control prepunch means, a plurality of sheets, means for applying first indicias to said sheets, and other prepunch means on said cards, means for feeding said sheets, seriatim, to said applying means, means under control of said other prepunch means of said first set of stacked cards, for causing said applying means to apply first indicias to said sheets, successively, a second set of computer cards provided with prepunch stacking means corresponding to the prepunched stacking means on the first set of cards, means to feed the cards of the second set, successively, in an order corresponding to the order of stacking of the cards of the first set, to said sheets, said cards of the second set being provided with transferable second indicias, and means for transferring said second indicias on the cards of the second set, to said sheets, successively, so that each sheet has first indicias and second indicias applied thereto, controlled by corresponding pairs of cards of the first and second sets of computer cards.

* * * * *